March 12, 1968  D. S. JENNEY  3,372,758
VIBRATION ABSORBER
Filed Feb. 15, 1967
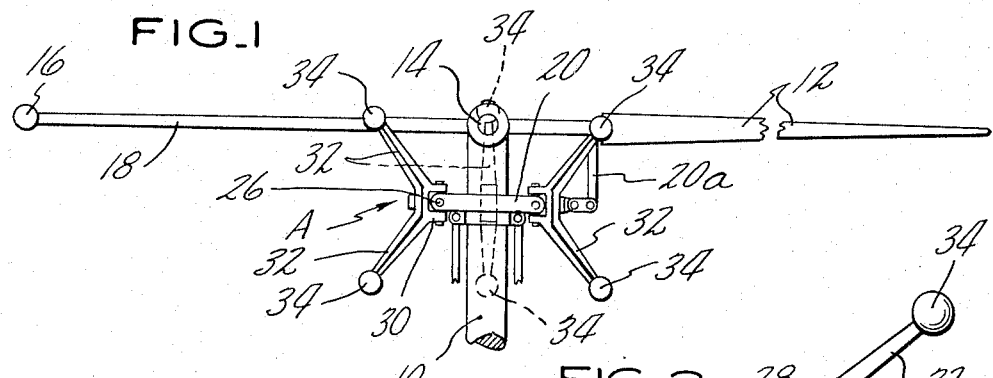
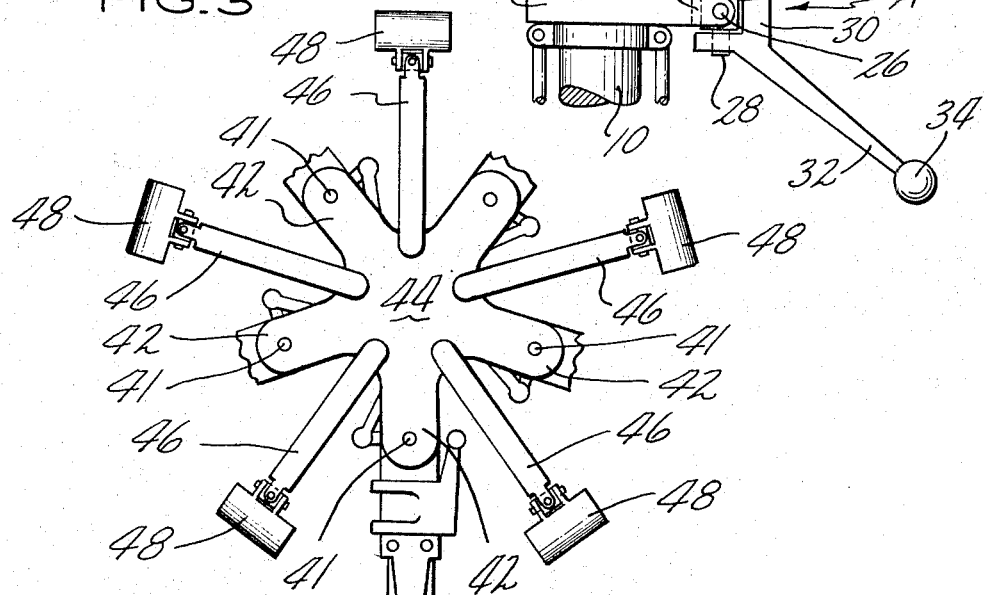
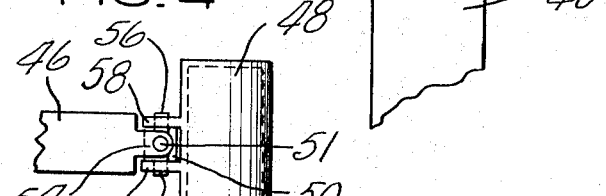
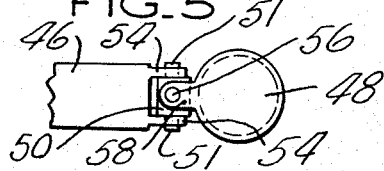
INVENTOR
DAVID S. JENNEY
BY M. B. Tasker
ATTORNEY United States Patent Office 3,372,758
Patented Mar. 12, 1968

3,372,758
VIBRATION ABSORBER
David S. Jenney, Stratford, Conn., assignor to United Aircraft Corporation, East Hartford, Conn., a corporation of Delaware
Filed Feb. 15, 1967, Ser. No. 616,308
8 Claims. (Cl. 170—159)

ABSTRACT OF THE DISCLOSURE

A centrifugally tuned vibration absorbing apparatus is provided for a helicopter rotor having pendulum type absorber weights mounted to rotate with the rotor. The absorber weights are mounted for pendulous movement about coincident vertical and horizontal axes and are tuned to absorb both vertical and horizontal vibrations.

Background of the invention

This invention relates to helicopters and particularly to centrifugally tuned vibration absorbing apparatus capable of acting to absorb both vertical vibrations and horizontal vibrations. Heretofore vibration absorbers have been provided for helicopter rotors. These however were capable of absorbing horizontal vibrations only or vertical vibrations only, i.e., vibrations in planes transverse to the axis of rotation or in planes parallel thereto. Examples of vertical vibration absorbers are shown in U.S. Patent No. 2,225,929 to R. R. R. Sarazin, issued Dec. 24, 1940 and U.S. Patent No. 2,519,762, issued Aug. 22, 1950, to A. R. Hoffman, et al. An example of a horizontal vibration absorber is shown in U.S. Patent No. 2,495,565 to Baker, issued Jan. 24, 1950. Also in U.S. patent to Mard et al., No. 3,005,520, issued Oct. 24, 1961, a dual spring type absorber is disclosed for use in the nose of a helicopter. This spring type absorber utilizes a single mass which absorbs both vertical and horizontal vibrations but is subject to certain undesirable limitations inherent with the use of springs. The present invention, which does not use springs, is especially advantageous in applications where the vibrations are set up in rotating members as, for example, rotor blades.

Summary

This invention relates to a centrifugally tuned vibration absorber in which a pendulum is mounted to absorb both vertical and horizontal vibrations in the rotating structure. Essentially this is accomplished by mounting the pendulum on a rotating part of the rotor system so it is free to pivot about both generally horizontal and generally vertical axes and by tuning the absorber in both these directions of movement to get the desired absorption.

It is therefore an object of this invention to provide a tuned, centrifugal vibration absorber of the pendulum type for helicopter rotors capable of absorbing both vertical and horizontal vibrations developing in the rotor.

Description of the drawings

In the drawings,

FIG. 1 is a somewhat diagrammatic showing of a single blade helicopter equipped with the dual type vibration absorber of this invention;

FIG. 2 is a detail on an enlarged scale of one of the pendulum type absorbers;

FIG. 3 is a somewhat diagrammatic showing of a five blade helicopter rotor equipped with a modified absorber embodying the invention and suitable for multi-blade rotors;

FIG. 4 is a detail view on an enlarged scale of the pendulum absorber of FIG. 3; and FIG. 5 is an end view of the absorber of FIG. 4.

Description of the preferred embodiment

As shown in FIG. 1, a helicopter rotor is shown comprising a rotor drive shaft 10 to the upper end of which a single rotor blade 12 is pivotally attached at 14. Blade 12 carries a counter weight 16 mounted on an extension 18 of the blade at the opposite side of the blade pivot 14. A swash plate 20 carried by the rotor drive shaft for rotation therewith has a control rod 20a attached at its upper end to the blade pitch control horn. Swash plate 20 has three sets of bifurcated lugs 22 spaced around its periphery 120 degrees apart and on each of these is mounted a pendulum vibration absorber generally indicated at A. To this end a block 24 (FIG. 2) is mounted between each pair of spaced lugs 22 on a generally horizontal pivot pin 26. Block 24 has upper and lower generally vertical pins 28, resembling trunnions, on which the pendulum 30 is pivoted. Pendulum 30 has two divergent arms 32 which lie in the same vertical planes and carry solid weights 34 at their extremities.

It will thus be evident that the pendulum absorber 30 is mounted for universal movement about horizontal pin 26 and vertical pins 28, these together with block 24 comprising a universal joint.

Vibration absorbers have not been commonly used on helicopter rotors because of the severe weight penalty which would be introduced. The weight penalty is minimized for small helicopters for which the exciting force is high. The use of the dual acting absorber of this invention to cancel forces in both horizontal and vertical directions introduces further weight saving.

The absorber must be tuned properly in both the vertical and horizontal directions to a resonant condition in which the forces produced by the blades and the absorber are equal and opposite. In order to absorb horizontal vibrations a rotor should have its absorber frequency tuned to rotor frequency times the number of blades ±1. The vertical absorber frequency should be rotor frequency times the number of blades.

In operation, a system of pendulum absorbers as above described, if tuned as indicated, will absorb the primary vertical and horizontal vibrations generated by a rotor having any number of rotor blades. The tuning requirements provide a reasonable geometry for the absorber when arranged as in FIG. 2 for rotors having one, two or three blades.

In FIGS. 3, 4 and 5 an absorber system has been shown for rotors having more than three blades. The rotor shown has five blades 40, only one of which is illustrated. Each blade is pivoted for lag and lead movement at 41 on an arm 42 of a rotor hub and is also free to flap about a horizontal flapping pin (not shown). The hub consists of closely spaced, identical upper and lower plates of which only the upper plate shows in FIG. 3. Between the upper and lower plates a series of five radial arms 46 are rigidly mounted, one between each pair of rotor blades. Each of these arms carries a pendulum absorber 48 at its outer end. To reduce weight these arms may be made hollow.

One of these absorbers 48 and its universal mounting is best shown in FIGS. 4 and 5. Here a block 50 carries vertical pins 51 by which it is pivotally mounted between spaced ears 54 on the ends of an arm 46. The block also carries horizontal pivot pins 56 which extend through ears 58 on the absorber mass 48. It will thus be evident that the absorber mass is mounted for universal movement about coincident axes at right angles to each other. Mass 48 may be a solid body. Herein it is shown as a thin walled cylinder filled with mercury which offers the advantage of high density with low moment of inertia. As the absorber pivots about pins 56 the absorber rotates but the mercury does not.

From the above description it will be clear the universally mounted absorbers may be mounted on the swash plate or the rotor hub. In fact they may be mounted on any rotating part of the rotor system.

It will also be evident that if properly tuned in both vertical and honizontal directions the centrifugal pendulum absorbers described will absorb not only vertical vibrations developed by the rotor but horizontal vibrations as well.

While two illustrative examples of the invention have been shown and described herein, it will be understood that various changes in the construction and arrangement of the parts may be made without exceeding the scope of the accompanying claims.

I claim:

1. A centrifugally tuned vibration absorbing apparatus for a helicopter rotor comprising a pendulum type absorber mass mounted to rotate with the rotor, said absorber having its pendulum element mounted for pivotal movement about two axes which are coincident and at right angles to each other.

2. The vibration absorbing apparatus of claim 1 in which the pendulum element of the absorber is pivotally mounted on a rotating part of the rotor by means of a universal joint having coincident pivotal axes.

3. A device for absorbing both the axial and the lateral vibrations of a helicopter rotor comprising an absorber member mounted to rotate with the rotor, the mount for said absorber member comprising substantially horizontal and vertical intersecting pivots permitting vertical and horizontal movements respectively.

4. A helicopter rotor comprising an axial drive shaft, a rotor blade driven by said shaft, a swash plate carried by said shaft having a control rod connected to said blade for effecting pitch changes in the latter, and three or more centrifugally tuned absorber masses mounted on said swash plate, each comprising a pendulum mounted for rotation about both of two coincident axes at right angles to each other for enabling said masses to absorb both axial and lateral vibrations set up by said rotating blade.

5. A helicopter rotor as claimed in claim 4 in which the universally mounted absorbers each comprise a pair of divergent arms which lie in the same vertical planes and have their free ends enlarged to provided absorber weights.

6. A helicopter rotor comprising an axial drive shaft having a rotor hub at its upper end, a plurality of blades pivotally mounted on said hub, a plurality of rigid radially extended absorber supporting arms carried by said hub, one disposed between each adjacent pair of blades, and centrifugally tuned vibration absorbing weights mounted at the outer extremity of each of said arms on a universal joint for movement about two coincident axes at right angles to each other.

7. A helicopter rotor as claimed in claim 6 in which the universally mounted absorbers consist of pendulums including a concentrated mass at their outer extremities.

8. A helicopter rotor as claimed in claim 6 in which the absorber weights comprise a hollow horizontal cylinders containing a heavy fluid each of said cylinders having its major axis parallel with one of the axes of said universal joint.

References Cited
UNITED STATES PATENTS

| | | | |
|---|---|---|---|
| 2,211,076 | 8/1940 | Sarazin | 170—177 X |
| 2,225,929 | 12/1940 | Sarazin | 170—177 |
| 3,035,643 | 5/1962 | Kelley et al. | 170—160.25 X |

EVERETTE A. POWELL, JR., *Primary Examiner.*